US010397317B2

(12) United States Patent
Balkesen et al.

(10) Patent No.: US 10,397,317 B2
(45) Date of Patent: Aug. 27, 2019

(54) BOOMERANG JOIN: A NETWORK EFFICIENT, LATE-MATERIALIZED, DISTRIBUTED JOIN TECHNIQUE

(71) Applicant: Oracle International Corporation, Redwood Shores, CA (US)

(72) Inventors: Cagri Balkesen, Zurich (CH); Sam Idicula, Santa Clara, CA (US); Nipun Agarwal, Saratoga, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 15/720,442

(22) Filed: Sep. 29, 2017

(65) Prior Publication Data
US 2019/0104175 A1   Apr. 4, 2019

(51) Int. Cl.
*H04L 29/08*   (2006.01)
*G06F 16/27*   (2019.01)
(Continued)

(52) U.S. Cl.
CPC ...... *H04L 67/1046* (2013.01); *G06F 16/2456* (2019.01); *G06F 16/2471* (2019.01);
(Continued)

(58) Field of Classification Search
CPC ... H04L 67/1046; H04L 9/006; H04L 9/0643; G06F 17/30283; G06F 17/30498;
(Continued)

(56) References Cited

U.S. PATENT DOCUMENTS

2011/0131198 A1* 6/2011 Johnson ............ G06F 17/30498
707/714
2012/0317093 A1* 12/2012 Teletia ................ G06F 16/2456
707/714

(Continued)

OTHER PUBLICATIONS

Scheuermann et al., "Adaptive Algorithms for Join Processing in Distributed Database Systems", Distributed and Parallel Databases, dated Jul. 1, 1997, pp. 233-269.

(Continued)

*Primary Examiner* — Min Jung
(74) *Attorney, Agent, or Firm* — Hickman Palermo Becker Bingham LLP

(57) ABSTRACT

Embodiments comprise a distributed join processing technique that reduces the data exchanged over the network. Embodiments first evaluate the join using a partitioned parallel join based on join tuples that represent the rows that are to be joined to produce join result tuples that represent matches between rows for the join result. Embodiments fetch, over the network, projected columns from the appropriate partitions of the tables among the nodes of the system using the record identifiers from the join result tuples. To further conserve network bandwidth, embodiments perform an additional record-identifier shuffling phase based on the respective sizes of the projected columns from the relations involved in the join operation. Specifically, the result tuples are shuffled such that transmitting projected columns from the join relation with the larger payload is avoided and the system need only exchange, over the network, projected columns from the join relation with the smaller payload.

20 Claims, 7 Drawing Sheets

(51) Int. Cl.
  *H04L 9/00* (2006.01)
  *H04L 9/06* (2006.01)
  *G06F 16/2455* (2019.01)
  *G06F 16/2458* (2019.01)

(52) U.S. Cl.
  CPC .............. *G06F 16/27* (2019.01); *H04L 9/006* (2013.01); *H04L 9/0643* (2013.01)

(58) Field of Classification Search
  CPC ......... G06F 17/30445; G06F 17/30466; G06F 17/30463
  See application file for complete search history.

(56) References Cited

U.S. PATENT DOCUMENTS

| | | | |
|---|---|---|---|
| 2014/0280023 A1* | 9/2014 | Jagtap | G06F 17/30498 707/714 |
| 2017/0308578 A1* | 10/2017 | Chen | G06F 17/30595 |
| 2017/0371927 A1* | 12/2017 | Ramesh | G06F 17/30454 |
| 2018/0046550 A1* | 2/2018 | Chang | G06F 11/1451 |
| 2018/0113909 A1* | 4/2018 | Ramesh | G06F 17/30454 |
| 2018/0121563 A1* | 5/2018 | Ramesh | G06F 11/1435 |
| 2018/0150521 A1* | 5/2018 | Skalkowski | G06F 17/30466 |
| 2018/0173763 A1* | 6/2018 | Xia | G06F 17/30466 |
| 2018/0300388 A1* | 10/2018 | Bhide | G06F 17/30498 |

OTHER PUBLICATIONS

Sangkyu Rho et al., Optimizing distributed Join Queries: A Genetic Algorithm Approach, Annals of Operations Research, vol. 71, dated Jan. 1, 1997, pp. 199-228.

Kossman, Donald, "The State of the Art in Distributed Query Processing", ACM Computing Surveys, ACM, dated Dec. 1, 2000, pp. 422-469.

Polychroniou et al., "Track Join", Distributed Joins with Minimal Network Traffic, Oracle Labs, In Proceedings of the dated 2014 ACM SIGMOD International Conference on Management of Data, 26 pages.

Manegold et al., "Cache-Conscious Radix-Decluster Projections", Proceedings of the 30th VLDB Conference, Toronto, Canada, dated 2004, 12 pages.

DeWitt et al., "GAMMA—A High Performance Dataflow Database Machine", Proceedings of the 12th International Conference on Very Large Data Bases, dated Aug. 1986, 10 pages.

Bernstein et al., "Query Processing in a System for Distributed Database", Acm Transactions on Database Systems, vol. 6, No. 4, dated Dec. 1981, 24 pages.

Abadi et al., "Materialization Strategies in a Column-Oriented DBMS", dated 2007, 11 pages.

* cited by examiner

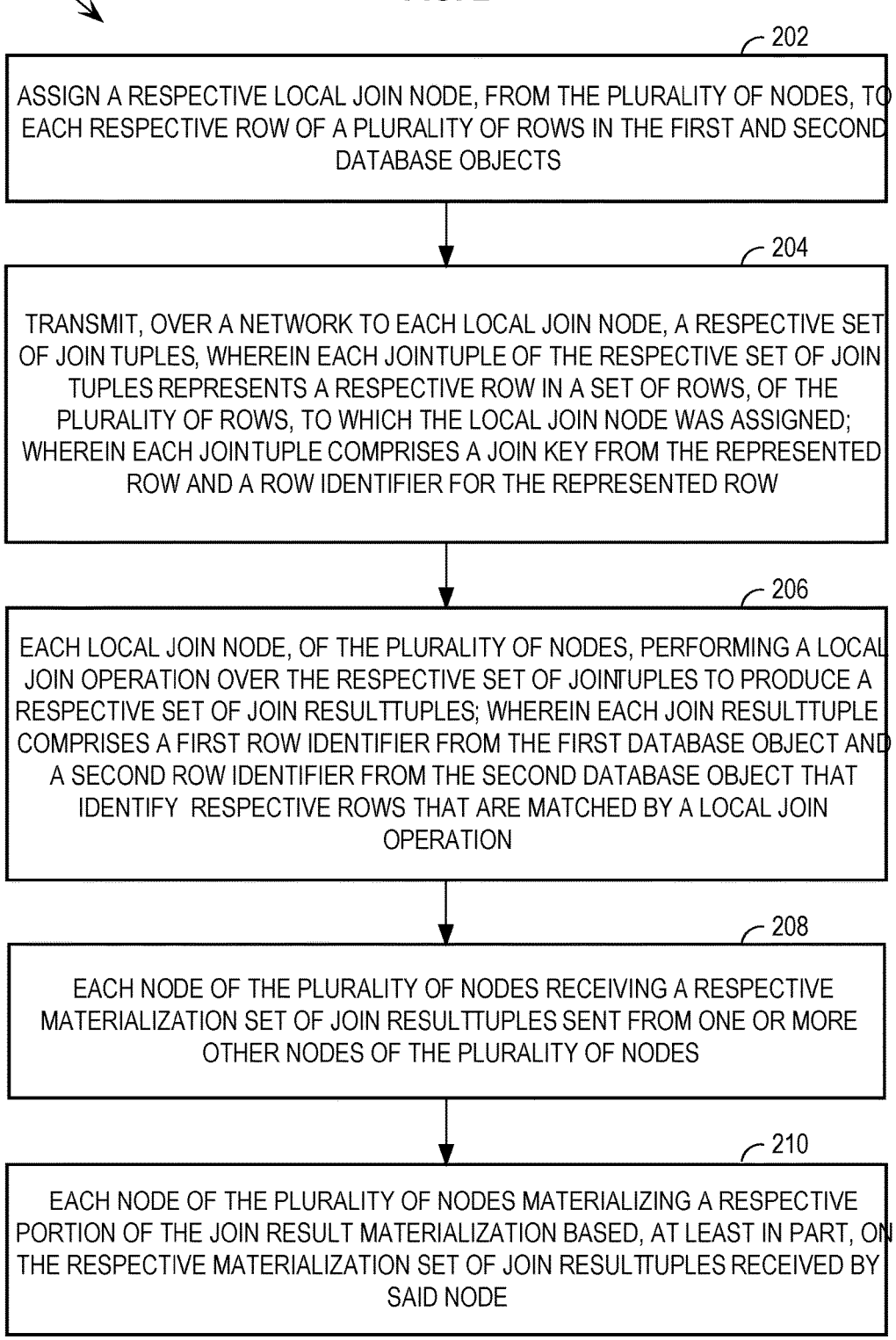

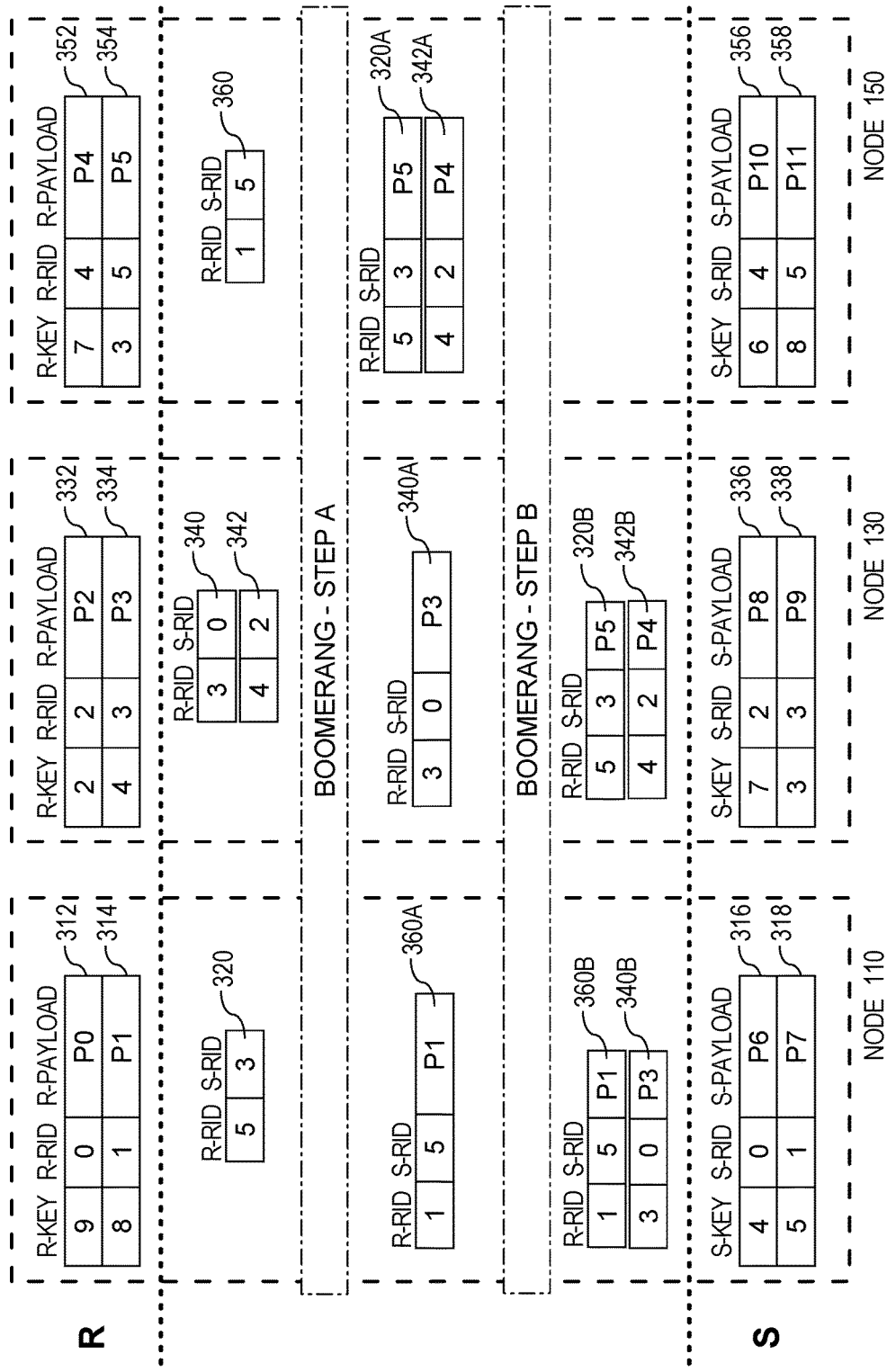

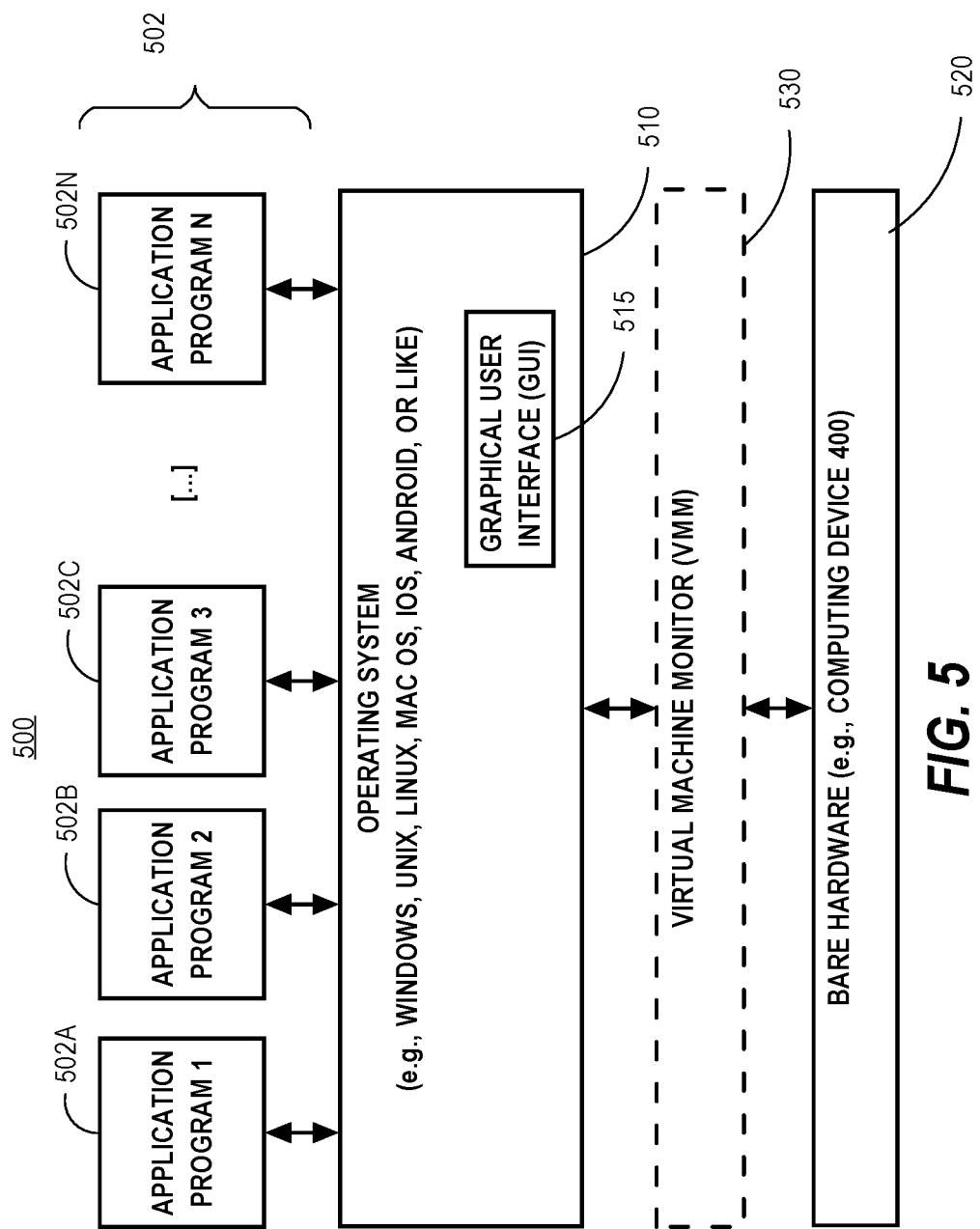

BOOMERANG JOIN: A NETWORK EFFICIENT, LATE-MATERIALIZED, DISTRIBUTED JOIN TECHNIQUE

FIELD OF THE INVENTION

The present invention relates to distributed join techniques and, more specifically, to a late-materialization based distributed join technique for a shared-nothing system that reduces the network bandwidth required to perform a distributed join operation.

BACKGROUND

Distributed joins can be used to join data from tables that are distributed horizontally among multiple nodes implementing a multi-node database management system. Traditional distributed join techniques exchange, over a network, all of the columns of tables that are required for the materialized result of a join operation, and hence cause the execution time of join queries to be dominated by the network time. This technique is widely-used and commonly referred as the "early-materialization" approach, where all required columns for a join are stitched together before being sent over the network to be assembled into the materialized join result.

The high amount of network bandwidth required to exchange data during an early-materialization approach for a join involving significant amounts of data results in a processing bottleneck. As such, data reduction techniques such as bloom filters are conventionally employed to reduce the amount of data exchanged. However such data reduction techniques generally affect the number of rows being exchanged during an early-materialization approach and still require a significant number of columns to be exchanged over the network.

Furthermore, early parallel database systems lay the foundation of distributed, parallel join processing. For example, in the Gamma project, row-based tuples are routed to processing nodes using hash-based split tables. Identical split tables are applied to both input relations and hence relations are distributed and partitioned row-by-row for independent parallel join processing. However, given the large amount of data shuffled between nodes in early systems such as Gamma (at times even including database data that is not required to be included in the join materialization), these systems suffer from the network data exchange bottleneck described above.

Also, the SDD-1 algorithm by Bernstein et al., introduced in the early years of distributed databases, aims to reduce network usage for distributed join processing. However, the algorithm is based on the idea that different database objects reside on different nodes as a whole, which is not the case in many modern distributed database management systems which generally horizontally partition database objects across multiple nodes of a system. Furthermore, the algorithm requires distributed execution rather than parallel execution of a distributed join operation, and also does not consider column-oriented storage of database data.

In terms of late materialization being performed by a single machine, Manegold et al. propose the use of cache-conscious radix-decluster projections for low selective joins to eliminate the random access memory costs arising during the materialization phase in a single machine. However, this solution is not applicable in modern distributed query processing systems, because, for data that is horizontally partitioned among the nodes of a shared-nothing system, various attributes of a tuple cannot consistently be directly accessed via record identifiers as required by this technique. Moreover, the technique does not address network bandwidth issues in a distributed system because upstream operators (utilized by the technique) require access to relevant attributes from the join result and, therefore, in order to apply principles of this technique to a distributed system, those attributes would need to be shipped to the corresponding processing nodes within the distributed system.

Also dealing with joins on a single machine, Abadi et al., analyze the trade-offs for materialization strategies in a column-oriented database system on a single machine and conclude that for operators with highly selective predicates it is almost always better to use a late-materialization strategy, and for joins, the right input table should be early-materialized in almost all of the cases. Since Abadi analyzes materialization techniques for a single machine, there is no consideration of the issue of network bottlenecking or of performing materialization on a distributed system.

Further, the Track Join approach focuses on reducing redundant data transfers across the network by generating an optimal transfer schedule for each distinct join key. However, this approach changes the skeleton of the main partitioned join-processing algorithm and requires intense computing in the CPU for each distinct join key. However, it does not reduce the footprint of individual tuples. Overall, this approach trades additional CPU work for the potential of less network data transfers.

Since the high amount of network bandwidth required to exchange data during an early-materialization approach for a distributed join operation involving significant amounts of data results in a processing bottleneck, it would be beneficial to reliably reduce the amount of traffic exchanged over the network during distributed join operations without causing an increase in CPU usage.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for performing a late-materialization join operation, over first and second database objects that are horizontally partitioned across a plurality of nodes, to produce a join result materialization.

FIGS. 3A-C depict horizontally-partitioned database objects stored within the nodes of a database management system, and also depict exchanges and processing of tuples in connection with an example late-materialization distributed join operation.

FIG. 5 is a block diagram of a basic software system that may be employed for controlling the operation of a computer system.

DETAILED DESCRIPTION

Figure 1:
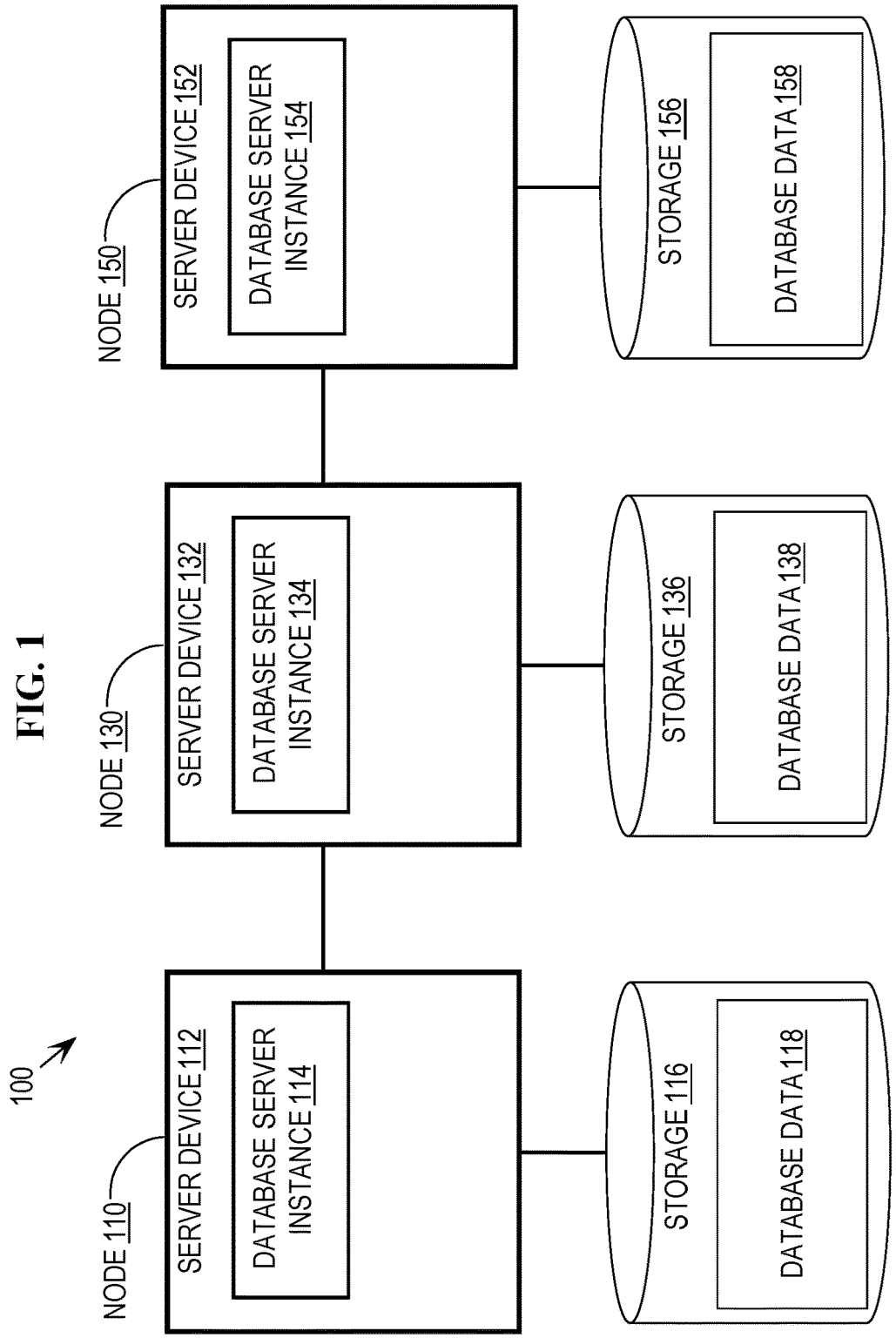
FIG. 1 is a block diagram that depicts an example database management system.

In the following description, for the purposes of explanation, numerous specific details are set forth in order to provide a thorough understanding of the present invention.

It will be apparent, however, that the present invention may be practiced without these specific details. In other instances, well-known structures and devices are shown in block diagram form in order to avoid unnecessarily obscuring the present invention.

General Overview

Embodiments comprise a distributed join processing technique, referred to herein as a "boomerang join", that reduces the amount of data exchanged over the network by utilizing a late-materialization technique. The boomerang join processing technique described herein provides important performance gains, especially for the execution of large distributed joins over column-oriented data. Embodiments of the boomerang join reduce the data exchanged over the network that is commonly the bottleneck for processing distributed join operations in large, shared-nothing database systems.

Embodiments first evaluate the join using a partitioned parallel join technique based on join tuples that represent the rows that are to be joined, i.e., comprising <join-key, record-identifier> pairs. For example, a shared-nothing database management system (DBMS) identifies partitions for join tuples using hash partitioning techniques. Each node that receives join tuples performs a local join on the received tuples, resulting in a respective list of join result tuples (comprising <record-identifier-table1, record-identifier-table2>) that identify the matching records from the joined tables. As a result, preparing for join result materialization only requires shuffling very small join tuples over the network without shuffling payload columns from the tables being joined, which is a significant improvement over prior techniques based on the relatively small amount data required to be exchanged over the network.

Since the join result tuples do not include all information needed to produce the join result generation (referred to as materialization herein), embodiments fetch, over the network, projected columns from the appropriate partitions of the tables among the nodes of the system using the record identifiers from the join result tuples. Thus, in order to further reduce the amount of data that must be shuffled in preparation for the materialization phase of the boomerang join, embodiments perform an additional record-identifier shuffling phase referred to herein as a "boomerang" phase.

According to one or more embodiments, during the boomerang phase the join result tuples are first shuffled to the node that stores data for the join result tuple from the relation that contributes the larger amount of the projected columns for the join result materializations. After this shuffling, the node that received the join result tuple fetches projected columns for the join result tuple from the relation that contributes the smaller amount of data from the two relations being joined. As a result of this boomerang phase of shuffling join result tuples, the total amount of data exchanged can be significantly reduced when compared to early-materialization techniques depending on the requirements of the join operation.

According to one or more further embodiments, instead of sending join result tuples to the source of the relation with the larger payload, during the boomerang phase the join result tuples are first sent to the source of the relation with the smaller payload. At the receiving side, each node fetches the payload of the smaller relation (indicated by received join result tuples) from the local memory and sends a stitched tuple (comprising the fetched payload and the identifier for the record in the relation with the larger payload) to the source node of the other relation indicated in respective join result tuples. According to such embodiments, the boomerang phase only requires shuffling the payload of the smaller relation over the network.

Thus, one of the benefits of the boomerang join is that, during the boomerang phase, the result tuples are shuffled such that transmitting projected columns from the relation with the larger payload is avoided and the system need only exchange, over the network, projected columns from the relation with the smaller payload in order to prepare for materialization of the join result.

Joining Tables Stored in Horizontally Partitioned Databases

Figure 3A:
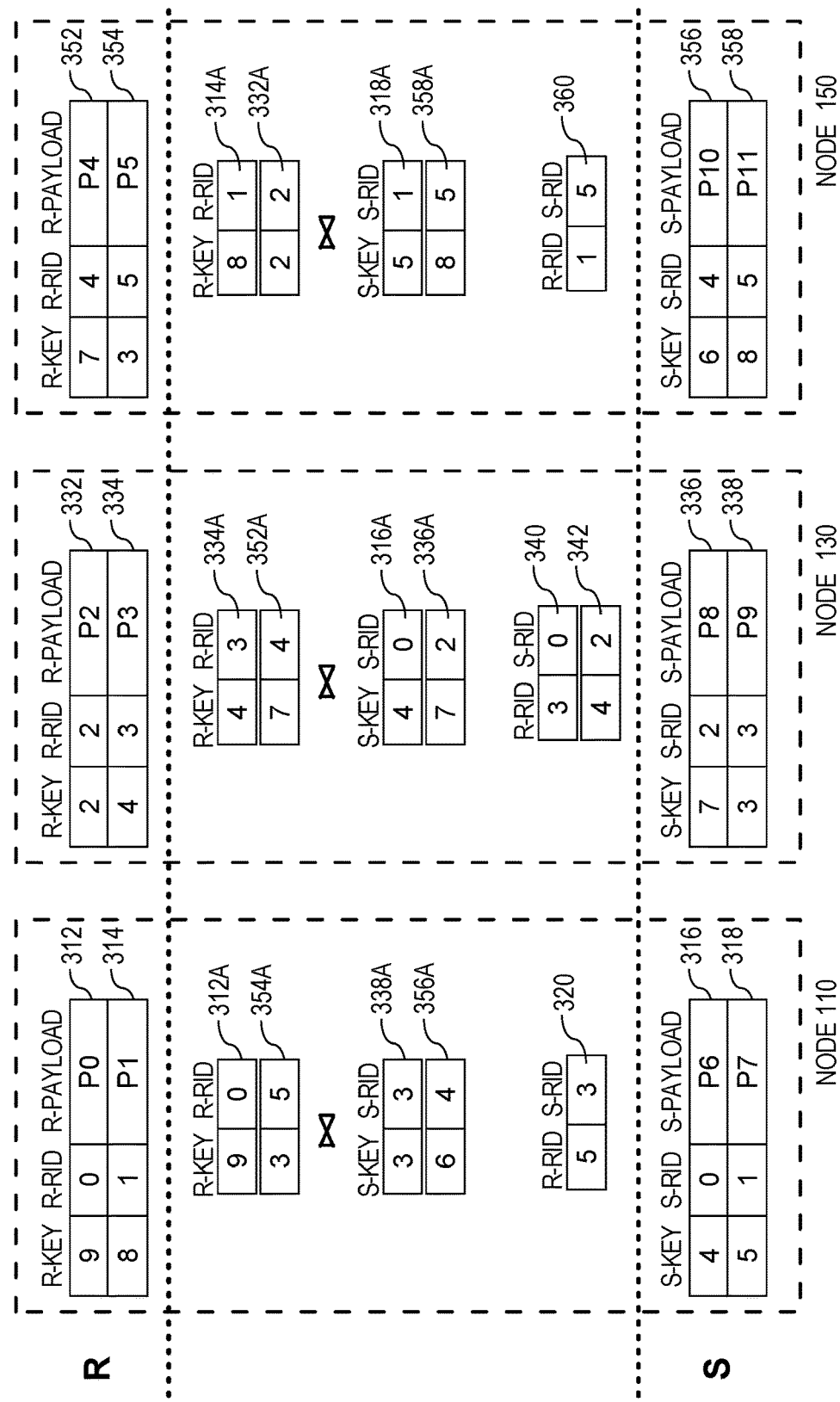

Many times, in shared-nothing database systems, very large tables storing database data are partitioned horizontally across the nodes of the system. For example, FIG. 1 depicts a shared-nothing DBMS 100 comprising three nodes 110, 130, and 150. FIG. 3A further depicts tables R and S horizontally partitioned across nodes 110, 130, and 150. DBMS 100 (as depicted in FIG. 1 and FIGS. 3A-C) is presented as an example, and systems implementing embodiments described herein may comprise any number of nodes with data partitioned thereon in any number of ways.

Figure 3B:
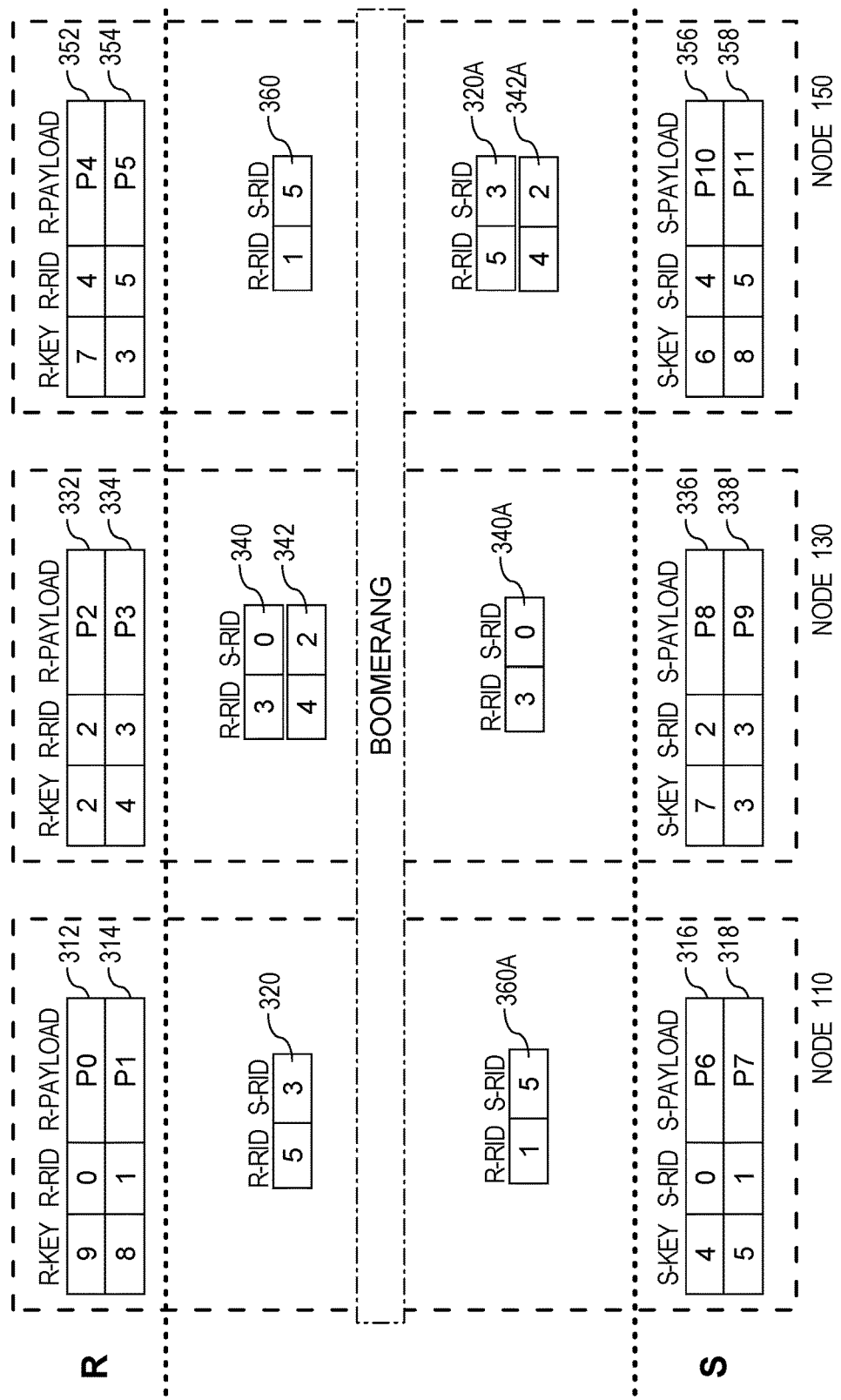

According to embodiments, the data depicted within nodes 110, 130, and 150 in FIG. 3A-C is stored, maintained, and manipulated as described herein by resources associated with nodes 110, 130, and 150. For example, the database data depicted as being stored within node 110 in FIG. 3A is maintained, within database data 118 in storage 116, by database server instance 114 running on server device 112. Further, processing of data depicted within node 110 in FIGS. 3A-C is performed by database server instance 114 and data associated with such processing is stored, as needed, within volatile memory in server device 112 and/or within storage 116. According to embodiments, actions described herein as being performed by a node, such as node 110, is performed by the database server instance or other resource associated with the node, such as by database server instance 114 of node 110.

As shown in FIGS. 3A-C, each node 110, 130, and 150 maintains, in storage, a partition of data from table R (i.e.: rows 312 and 314 on node 110; rows 332 and 334 on node 130; and rows 352 and 354 on node 150). Further, each node 110, 130, and 150 maintains, in storage, a partition of data from table S (i.e.: rows 316 and 318 on node 110; rows 336 and 338 on node 130; and rows 356 and 358 on node 150). Thus, the data for tables R and S are horizontally partitioned across nodes 110, 130, and 150.

According to embodiments, DBMS 100, that comprises nodes 110, 130, and 150, receives a command to perform a join over tables R and S. For example, DBMS 100 receives, from a database client, the following Query 1 that performs a join over tables R and S:

Query 1: SELECT R.R_PAYLOAD, S.S_PAYLOAD
  FROM R, S
  WHERE R.R_KEY=S.S_KEY

Accordingly, DBMS 100 performs a distributed join operation, over the indicated database objects (i.e., tables R and S), which are horizontally partitioned across a plurality of nodes (i.e., nodes 110, 130, and 150). Query 1 depicts a join operation involving only one join key per each of the two database objects to be joined. However, according to embodiments, a join operation may involve any number of join keys across any number of tables.

When DBMS 100 receives a query that requires a distributed join operation, such as Query 1, a query optimizer of DBMS 100 determines, based, at least in part, on database statistics and the query, whether to use a late-materialization join according to embodiments for the join operation. An embodiment is used to perform such a distributed join operation in response to the query optimizer determining to do so, as described in further detail below.

FIG. 2 depicts a flowchart 200 for performing a boomerang late-materialization join operation, over first and second database objects that are horizontally partitioned across a plurality of nodes, to produce a join result materialization, according to embodiments. In connection with flowchart 200, the functions that are performed by multiple nodes but described with respect to a single node are performed in parallel by all applicable nodes.

Hash Partitioning of a Join Operation

At step 202 of flowchart 200, a respective local join node, from a plurality of nodes, is assigned to each respective row of a plurality of rows in the first and second database objects. For example, the shared-nothing DBMS 100 that comprises nodes 110, 130, and 150 assigns a respective one of the nodes (110, 130, or 150) as the local join node for each respective row of the database objects to be joined, e.g., tables R and S.

According to embodiments, the system assigns local join nodes to records from the relations to be joined using any partitioning technique. For example, DBMS 100 utilizes a hash partition operation during which each of the nodes, storing at least one partition of table R or S, in system 100 performs a particular hash function (e.g., [join-key] MOD 3) over the join keys of the rows of tables R and/or S maintained by the node.

Any given result of the hash function is mapped, within mapping data, to a respective node in DBMS 100. For example, the example hash function above, [join-key] MOD 3, has three possible outcomes, i.e., "0", "1", and "2". In mapping data, "0" is a join node identifier mapped to node 110, "1" is a join node identifier mapped to node 130, and "2" is a join node identifier mapped to node 150. As such, the result of the hash operation, for each row, indicates the node of the system that is the local join node for the row. According to embodiments, any hash function may be used to partition the records for a join operation among the nodes of a system.

To illustrate operation of a hash-based partition, node 110 identifies the join node for each row of tables R and S maintained by node 110. For example, based on the join key from row 312, which is "9", node 110 determines that the join node identifier for row 312 is 9 MOD 3=0. Since node 110 is mapped to the join node identifier "0", node 110 assigns itself to be the join node for row 312. Nodes 110, 130, and 150 identify the join node for each of the rows of tables R and S in a similar manner.

At step 204 of flowchart 200, a respective set of join tuples are transmitted over a network to each local join node, where each join tuple of the respective set of join tuples represents a respective row in a set of rows, of the plurality of rows, to which the local join node was assigned, and where each join tuple comprises a join key from the represented row and a row identifier for the represented row.

For example, each of nodes 110, 130, and 150 generates a join tuple for each row maintained by the node that is assigned a join node other than the originating node (i.e., the node that maintains the row). Each join tuple includes the join key from the represented row and a row identifier that uniquely identifies the represented row. For example, node 110 generates join tuple 314A (subsequently transmitted to node 150 as described below) that includes the R_KEY and the R-RID from row 314. Thus, join tuple 314A uniquely represents row 314. According to embodiments, node 110 does not generate a join tuple for row 312 distinct from the representation of the row maintained by node 110, since the join node for the row is the originating node and a join tuple need not be shuffled to a non-originating join node.

Each of nodes 110, 130, and 150 transmits, to other nodes of DBMS 100, join tuples that represent the rows assigned to those other nodes during the partitioning operation in step 202. To illustrate, FIG. 3A depicts each node having received the join tuples to which the nodes are assigned (where some of the depicted join tuples, such as join tuple 312A, are representations of data actually maintained by the node rather than a tuple that is distinct from the maintained row). More specifically, node 110 maintains or has received data for join tuples 312A, 354A, 338A, and 356A, (which represent rows 312, 354, 338, and 356, respectively) since the join keys (R_KEY and S_KEY) of those tuples hash to the join node identifier "0". Node 130 maintains or has received data for join tuples 334A, 352A, 316A, and 336A, (which represent rows 334, 352, 316, and 336, respectively) since the join keys of those tuples hash to the join node identifier "1". Further, node 150 maintains or has received data for join tuples 314A, 332A, 318A, and 358A, (which represent rows 314, 332, 318, and 358, respectively) since the join keys of those tuples hash to the join node identifier "2".

Join Tuple-Based Local Join Operations

At step 206, each local join node, of the plurality of nodes, performs a local join operation over the respective set of join tuples to produce a respective set of join result tuples; wherein each join result tuple comprises a first row identifier from the first database object and a second row identifier from the second database object that identify respective rows that are matched by a local join operation. For example, node 110 performs a local join operation over the set of join tuples assigned to node 110 by performing a join based on R_KEY=S_KEY among those tuples assigned to the node. The join is a "local" join since the node does not consider tuples assigned to any other node in order to perform the join since all tuples having join keys that potentially match any tuple assigned to a given node are also assigned to that node.

The local join at each node results in a respective set of join result tuples that reflect the join matches identified during the local join operation. Specifically, each join result tuple generated by the nodes represents a pair of rows (one from table R and one from table S) that include matching join keys (i.e., the same join key value). As such, each join result tuple includes an identifier of the row from the R table and an identifier of the row from the S table that have matching join keys. For example, as depicted in FIG. 3A, the local join operation on node 110 returns join result tuple 320, indicating that the row from table R with row identifier "5" matches the row from table S with row identifier "3". Further, the local join operation on node 130 returns join result tuples 340 and 342, and the local join operation on node 150 returns join result tuple 360.

Embodiments enable using any kind of join algorithm, including cache and hardware conscious algorithms. For example, one or more embodiments employ a hardware-conscious distributed radix hash join to implement steps 202-206 of flowchart 200.

Shuffling Result Tuples to Perform Join Materialization

At step 208, each node of the plurality of nodes receives a respective materialization set of join result tuples sent from one or more other nodes of the plurality of nodes. For example, each of nodes 110, 130, and 150 receives a set of join result tuples during a join result boomerang phase.

Shuffling Tuples During the Boomerang Phase Based on the Larger Contributor to Materialization According to one or more embodiments, during the boomerang phase, each node receives a set of join result tuples that refer to rows, maintained by the node, from the relation of the join that contributes the largest amount of data to the join result materialization. Herein, the relation of the join that contributes the largest amount of data to the join result materialization is referred to herein as the relation or table with the larger/largest payload.

For example, a first database object is identified as a target database object based, at least in part, on determining that a first amount of data required for the join result materialization for rows of the first database object is greater than a second amount of data required for the join result materialization for rows of the second database object. To illustrate, at compile time of Query 1, DBMS 100 identifies the target database object with the largest payload based, at least in part, on the join specification generated for Query 1 and database statistics including the number/size of the columns required by the join specification. According to one or more embodiments, in the determination of the target database object, the DBMS may further take into account the number of times that data from a given table matches with data from another table in the join operation.

For example, based on the join specification for the join operation in Query 1, DBMS 100 determines that table R contributes more data to the join materialization than table S. In other words, DBMS 100 determines that table R has the largest payload.

Furthermore, according to embodiments, during the boomerang phase each local join node, of the plurality of nodes, sends each join result tuple of at least a portion of the respective set of join result tuples to a node, of the plurality of nodes, that originated a row in the target database object identified by the first row identifier in said each join result tuple. For example, during the boomerang phase as depicted in FIG. 3B, node 110 sends join result tuple 320 to the node that originates the row identified in the join result tuple from table R (which is the relation with the largest payload). To illustrate as shown in FIG. 3B, node 110 determines that node 150 stores row 354 that corresponds to R-RID "5" from join result tuple 320. As such, during the boomerang phase, node 110 sends join result tuple 320 to node 150 (as depicted by join result tuple 320A at node 150).

According to embodiments, a node identifies which node originates a particular row identified by a given row identifier based on mapping data that maps row identifiers to nodes that originate (i.e., maintain) the data for the identified row. Continuing with the previous example, mapping data maintained by the system maps R-RIDs "4" and "5" to node 150 as the originating node for those rows. Node 110 determines that node 150 stores the row corresponding to R-RID "5" based on that mapping data.

According to further embodiments, a node identifies which node originates a particular row identified by a given row identifier based on information that identifies the originating node that is encoded within the row identifier itself. For example, a particular R-RID may be "5-2" indicating that the row identifier is "5" and the originating node identifier is "2" (i.e., node 150). To be clear, this embodiment is not depicted in FIG. 3B.

Materialization Phase after a Boomerang Phase Based on the Larger Contributor to Materialization At step 210 of flowchart 200, each node of the plurality of nodes materializes a respective portion of the join result materialization based, at least in part, on the respective materialization set of join result tuples received by said node. According to embodiments that base the boomerang phase on the larger contributor to join result materialization (i.e., the relation with the largest payload), the nodes materialize the portion of the join result materialization that corresponds to the materialization set of join result tuples received by the node by (a) retrieving projected columns over the network for the relation with the smaller payload and (b) retrieving, from memory, projected columns for the relation with the larger payload.

According to embodiments, the materialization set of join result tuples received at a particular node comprises those join result tuples, generated by any node in DBMS 100, that includes an identifier for the relation with the largest payload that originates at the particular node. For example, node 150 receives a materialization set of join result tuples in connection with the boomerang phase (i.e., join result tuples 320A and 342A), where each join result tuple in the materialization set refers to rows from the relation with the largest payload (table R) that are stored at node 150. During a materialization phase, node 150 retrieves over the network projected columns for the relations with the smaller payload, as needed.

Specifically, during the materialization phase, a particular node, of the plurality of nodes, materializes a particular row of the join result materialization based, at least in part, on a particular join result tuple of a particular materialization set of join result tuples received by the particular node, in part by retrieving, from memory of the particular node, first projected columns from the first database object for a first row, of the first database object, identified by a particular first row identifier included in the particular join result tuple. For example, to materialize a row of the join result materialization corresponding to join result tuple 320A, node 150 retrieves, from storage 156 (FIG. 1), the payload column for row 354 (R_PAYLOAD "P5") that corresponds to the R-RID "5" of join result tuple 320A.

Further, the particular node continues the materialization phase for the particular row of the join result materialization by requesting, from a second node of the plurality of nodes, second projected columns from the second database object for a second row, of the second database object, identified by a particular second row identifier included in the particular join result tuple. For example, node 150 determines that node 130 is the originator of row 338 that corresponds to S-RID "3" from join result tuple 320A (i.e., according to techniques for determining row originator nodes described above). As such, node 150 requests, from node 130, the projected column for table S (i.e., S_PAYLOAD "P9") from row 338 of table S, e.g., by sending the S-RID from join result tuple 320A to node 130. Of course, in cases where both of the rows referred to in a particular join result tuple are stored at the same node, no data need be retrieved from a second node.

The particular node completes the materialization phase for the particular row of the join result materialization by creating the particular row, of the join result materialization, comprising both the first projected columns for the first row and the second projected columns for the second row. For example, node 150 receives the projected column for table S from row 338 and materializes the particular row of the join result materialization that corresponds to join result tuple 320A with the R_PAYLOAD from row 354 ("P5") and with the S_PAYLOAD from row 338 ("P9").

Shuffling Tuples During the Boomerang Phase Based on the Smaller Contributor to Materialization According to the embodiments described above, join result materialization requires sending both (a) the materialization set of join result tuples to the node that originates the row data for the relations with the largest payload and (b) row identifiers for rows in the relation with the smaller payload to the node that originates the row data for the relation with the smaller payload. However, the amount of data being sent over the network be further reduced by changing the initial nodes to which join result tuples are sent in the boomerang phase.

Thus, according to one or more further embodiments, instead of sending join result tuples to the originating node for rows from the relation with the larger payload, the join result tuples are sent, during a step A of the boomerang phase, to the originator of the relation with the smaller payload. During a step B of the boomerang phase, the node that received the join result tuples from step A of the boomerang phase creates a stitched join result tuple that includes the projected columns from the relation with the smaller payload and then sends the stitched join result tuples to the originator of the row identified within the stitched tuple from the relation with the largest payload.

Thus, according to such embodiments, DBMS 100 identifies the first database object (i.e., table R) as a target database object based, at least in part, on determining that a first amount of data required for the join result materialization for rows of the first database object is smaller than a second amount of data required for the join result materialization for rows of the second database object. Such determination may be made in the manner set forth above in connection with determining the relation with the largest payload.

During step A of the boomerang phase, each local join node, of the plurality of nodes, sends each join result tuple of at least a portion of the respective set of join result tuples to a node, of the plurality of nodes, that originated a row in the target database object (i.e., the smaller contributor) identified by the first row identifier in said each join result tuple. For example, node 110 sends join result tuple 320, generated from the local join operation, to the node that originates the portion of data for the join result tuple from table R (which, in this example, is determined to be the relation with the smaller payload). To illustrate as shown in FIG. 3C, node 110 determines (according to one or more techniques described above) that node 150 originates row 354 that corresponds to R-RID "5" from join result tuple 320. As such, during step A of the boomerang phase, node 110 sends join result tuple 320 to node 150 (as shown by join result tuple 320A at node 150 in FIG. 3C).

The node that receives join result tuples in step A of the boomerang phase creates, during step B of the boomerang phase, a stitched tuple using a received join result tuple and data for the table with the smaller payload and then sends the stitched tuple to the node that originates data for the larger contributor. For example, node 150 receives join result tuple 320 from node 110. As such, node 150 retrieves first projected columns from a first row identified by a particular first row identifier from the received join result tuple. For example, node 150 retrieves, from storage 156 (FIG. 1), the R_PAYLOAD column for row 354 that corresponds to the R-RID "5" from received join result tuple 320 (i.e., R_PAYLOAD "P5").

Node 140 then creates a stitched join result tuple that includes (a) the first projected columns and (b) a particular second row identifier from the particular join result tuple. For example, node 150 creates a stitched join result tuple 320A that comprises the R_PAYLOAD data from row 354 and the row identifier for table S from join result tuple 320 (i.e., S-RID "3"). In the example depicted in FIG. 3C, stitched join result tuple 320A also comprises R-RID "5" from join result tuple 320.

During step B of the boomerang phase, node 150 sends the stitched join result tuple to another node of the plurality of nodes that stores a record that matches the particular second row identifier. For example, node 150 sends stitched join result tuple 320A to node 130, which is the originator of data for the row 338 identified by S-RID "3" from join result tuple 320A. Node 150 determines the originator of the row identified by the particular S-RID according to techniques described above. Thus, during step B of the boomerang phase, each of nodes 110, 130, and 150 receives a materialization set of join result tuples comprising the stitched join result tuples that refer to rows, from the relation with the largest payload, that are maintained at the respective node.

As depicted in FIG. 3C, the materialization set of join result tuples for node 150 is empty. Further, the materialization set of join result tuples for node 130 comprises stitched join result tuples 320B and 342B, and the materialization set of join result tuples for node 110 comprises stitched join result tuples 360B and 340B.

Materialization Phase after a Boomerang Phase Based on the Smaller Contributor to Materialization As indicated above, at step 210 of flowchart 200, during a materialization phase each node of the plurality of nodes materializes a respective portion of the join result materialization based, at least in part, on the respective materialization set of join result tuples received by said node. According to the above-described embodiments, the other node, of the plurality of nodes, materializes a particular row of the join result materialization based, at least in part, on the stitched join result tuple of the particular materialization set of join result tuples received by the particular node by first retrieving, from memory of the other node, second projected columns from the second database object for a second row, of the second database object, identified by the particular second row identifier. For example, as depicted in FIG. 3C, node 130 receives stitched join result tuple 320B. Accordingly, during the materialization phase, node 130 retrieves, from storage 136 (FIG. 1), the projected columns for table S from row 338 corresponding to S-SID "3" included in stitched join result tuple 320B (i.e., S_PAYLOAD "P9").

To complete the materialization phase for the join result tuple, the other node then creates the particular row, of the join result materialization, comprising both the first projected columns for the first row and the second projected columns for the second row. For example, node 130 creates the particular row of the join result materialization corresponding to stitched join result tuple 320B comprising the projected column for table R from stitched join result tuple 320B (i.e., R_PAYLOAD "P5"), and the projected column retrieved for table S for stitched join result tuple 320B (i.e., S_PAYLOAD "P9").

According to such embodiments based on the smaller contributor to the join materialization, materialization of the join result only requires shuffling the payload of the smaller relation over the network and does not require the additional shuffling of identifiers over the network as is required by embodiments that are based on the larger contributor to the join materialization described above.

Database Management Systems

Embodiments of the present invention are used in the context of database management systems. Therefore, a description of a DBMS is useful. A DBMS manages a database. A DBMS may comprise one or more database servers, as described in further detail below. A database comprises database data and a database dictionary that are stored on a persistent memory mechanism, such as a set of hard disks. Database data may be stored in one or more data containers. Each container contains records. The data within each record is organized into one or more fields. In relational DBMSs referred to herein, the data containers are referred to as relations or tables, the records are referred to as rows, and the fields are referred to as columns. According to further embodiments in object-oriented databases, the data containers are referred to as object classes, the records are referred to as objects, and the fields are referred to as attributes. Other database architectures may use other terminology.

Users may interact with an instance of a database server of a DBMS by submitting, to the database server instance, commands that cause the database server instance to perform operations on data stored in a database. For example, a user at a client device submits, via a database client, a database command requiring a distributed join (such as Query 1) to database server instance 114 with which the database client maintains a connection. A user may be one or more applications running on a client device that cause the database client to interact with database server instance 114. Multiple parties may access database resources through a given application. Multiple parties and/or users may also be referred to herein, collectively, as a user.

Shared-Nothing Databases

In shared-nothing systems, such as DBMS 100, all processors, memories and disks are grouped into nodes. In shared-nothing systems as in shared disk systems, each node may itself constitute a shared everything system or a shared disk system. A shared-nothing database assumes that a process can only access data if the data is contained on a disk that belongs to the same node as the process. Consequently, if a particular node wants an operation to be performed on a data item that is owned by another node, the particular node must send a request to the other node for the other node to perform the operation. Thus, instead of shipping the data between nodes, shared-nothing databases are said to perform "function shipping".

Because any given piece of data is owned by only one node, only the one node (the "owner" or "originator" of the data) will ever have a copy of the data in its cache. Shared-nothing databases may be run on both shared disk and shared-nothing multi-processing systems. To run a shared-nothing database on a shared disk machine, a mechanism may be provided for partitioning the database, and assigning ownership of each partition to a particular node.

Example Network Arrangement

According to one or more embodiments, one or more of nodes 110, 130, and 150 implement a shared-nothing database management system 100. According to one or more embodiments, nodes 110, 130, and 150 are at least part of a cluster of nodes managed by the multi-node DBMS 100, e.g., a Massively Parallel (MPP) shared-nothing database environment. According to one or more embodiments, any number of nodes may be part of a node cluster managed by a multi-node DBMS such as DBMS 100. Specifically, resources from multiple nodes in a multi-node database system can be allocated to run a particular database server's software.

Server devices 112, 132, and 152 are implemented by any type of computing device that is capable of running a database server instance to manage data in storage for the server devices and capable of communicating with other nodes in the cluster. In FIG. 1, server device 112 is configured with a database server instance 114, server device 132 is configured with a database server instance 134, and server device 152 is configured with a database server instance 154.

A database server instance (or "instance") is a server that comprises a combination of the software and allocation of resources from a node. Specifically, a server, such as a database server, is a combination of integrated software components and an allocation of computational resources, such as memory, a node (i.e., a computing device), and/or processes on the node for executing the integrated software components on a processor, the combination of the software and computational resources being dedicated to performing a particular function on behalf of one or more clients.

Database server instance 114 maintains access to and manages database data 118 stored in storage 116, database server instance 134 maintains access to and manages database data 138 stored in storage 136, and database server instance 154 maintains access to and manages database data 158 stored in storage 156. According to one or more embodiments, access to a given database comprises access to (a) a set of disk drives storing data for the database, and (b) data blocks stored thereon.

According to one or more embodiments, database data 118, 138, and 158 is maintained, at least in part, as column-oriented data. Embodiments can also be applied to row-oriented data, where each row that is stored as row-oriented data, from the database tables being joined, is available in (or is decomposed into) a column-oriented format.

One or more of the functions attributed to processes running on nodes 110, 130, and 150, as described herein, may be performed any other logical entity that is part of DBMS 100, according to one or more embodiments. Server devices 112, 132, and 152 may be configured with other mechanisms, processes and functionalities, depending upon a particular implementation. Also, example DBMS 100 may comprise other devices, including client devices, server devices, storage devices, networks, and display devices, according to one or more embodiments.

In an embodiment, each of the processes and/or functionality described in connection with each of nodes 110, 130, and 150 is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Analytic Estimate of Network Savings for Large-to-Large Table Joins

According to embodiments, a query optimizer is required to analyze the amount of data that would be exchanged between the nodes of a shared-nothing system for large table to large table joins with a high distinct number of values for both tables and an average of one match per output table tuple. An example of such analysis is herein described in the context of the examples depicted in FIGS. 3A-3C.

Specifically, a query optimizer may utilize equations, as described below, to estimate the relative costs of performing a join operation using various techniques, including an early-materialization technique and the boomerang late-materialization join technique according to embodiments. The size of join tuples consisting of <key, RID> is represented herein by $\|t\|$. The size of attributes projected after the join is represented by $\|\Pi_R\|$ and $\|_S\|$ for the R and S tables, respectively. The size of the cluster in number of nodes is represented by N.

First, an equation is presented to predict the amount of data exchanged during an early-materialized join. Early-materialized joins carry out all projection attributes during partitioning over the network. In a uniform random distribution of join keys to all nodes, each node of nodes 110, 130, and 150 needs to send $(|R|+|S|)/N \times (N-1)/N$ tuples over the network. Therefore, the total data exchanged ($T_E$) by all of the nodes over the network is given by equation 1.

$$T_E=((N-1)/N)\cdot(|R|\cdot(\|t\|+\|\Pi_R\|)+|S|\cdot(\|t\|+\|\Pi_S\|)) \quad (1)$$

Second, an equation is presented to predict the amount of data exchanged for a naïve materialization strategy for late-materialized joins in which each node of nodes 110, 130, and 150 is presumed to fetch the relevant payload of both the inner and outer relations. In addition to tuple exchanges in a join phase for such a naïve materialization strategy, RIDs and payloads of both relations R and S would be shuffled over the network for each of the $|S|$ result tuples. The amount of total data exchanged ($T_N$) is given by the equation 2.

$$T_N=((N-1)/N)\cdot(|R|\cdot(2\cdot\|t\|+\|\Pi_R\|)+|S|\cdot(2\cdot\|t\|+\|\Pi_S\|)) \quad (2)$$

Lastly, an equation is presented for embodiments comprising the boomerang technique for late-materialized joins. As described above, a benefit of this technique comes at avoiding shuffling of the payloads of one of the relations entirely. Therefore, in the boomerang phase, a number of RIDs on the order of the number of rows in the expected join result are shuffled. Afterwards, only the payloads of the relation with the smaller payload size (B) are shuffled over the network. The amount of total data exchanged ($T_B$) over the network is given by equation 3.

$$T_B=((N-1)/N)\cdot(|R|\cdot\|t\|+2\cdot|S|\cdot\|t\|+|S|\cdot(\|\Pi_B\|+\|t\|)); \text{ where}$$
$$B=\operatorname{argmin}_\Pi(R,S) \quad (3)$$

As shown in equation 3, the boomerang materialization technique results in significant reduction in network data exchange (a) if the payload size of the smaller relation is larger than the size of the join result tuples and (b) if there is a significant difference in the payload size of both relations.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
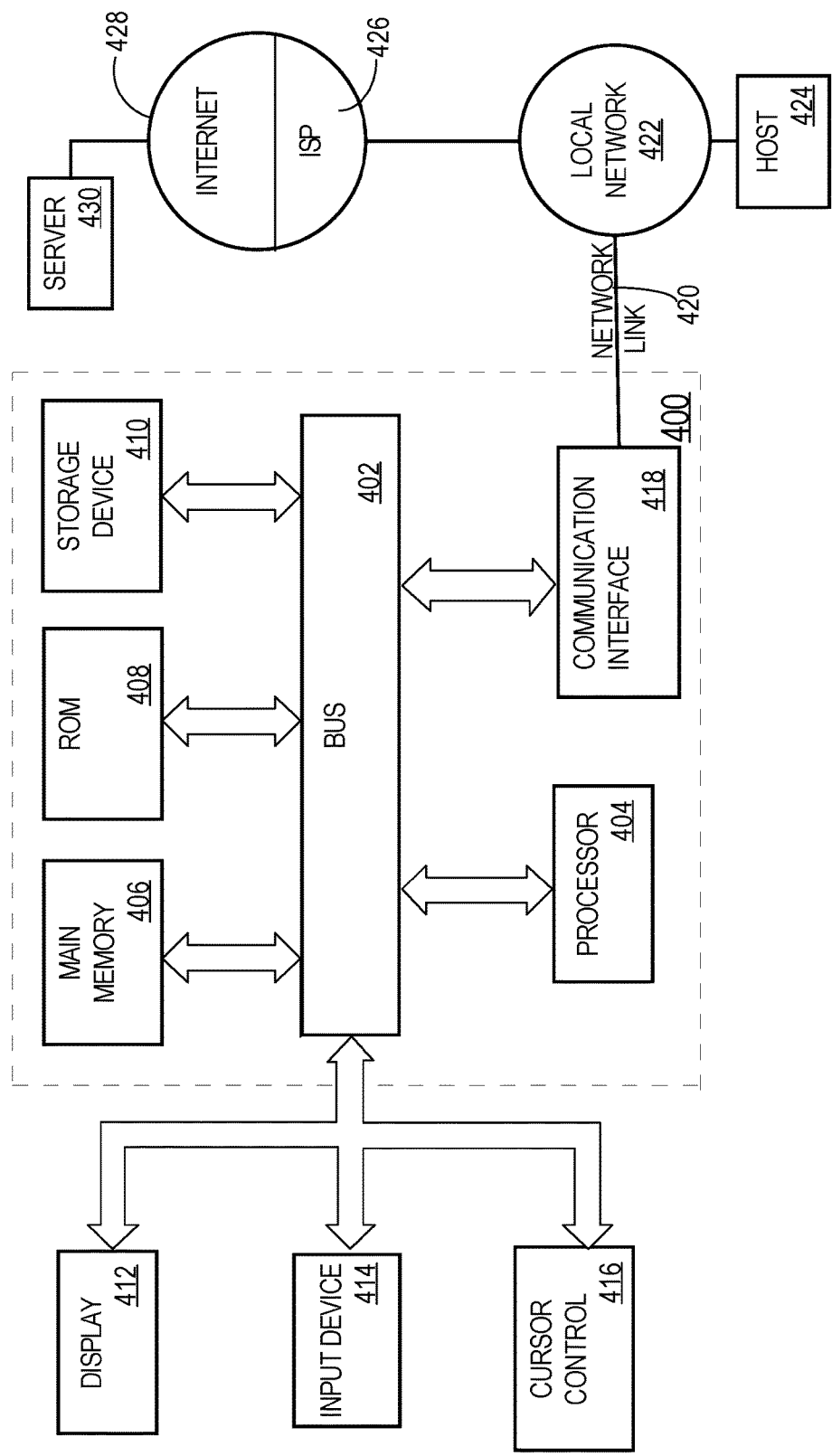
FIG. 4 is a block diagram of a computer system on which embodiments may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A computer-implemented method for a database management system performing a join operation, over a first database object and a second database object, which are horizontally partitioned across a plurality of nodes, to produce a join result materialization comprising:

assigning a respective local join node, from the plurality of nodes, to each respective row of a plurality of rows in the first database object and the second database object;

transmitting, over a network to each local join node, a respective set of join tuples, wherein each join tuple of the respective set of join tuples:

represents a respective row in a set of rows, of the plurality of rows, to which the local join node was assigned, and comprises a join key from the represented row and a row identifier for the represented row;

each local join node, of the plurality of nodes, performing a local join operation over the respective set of join tuples to produce a respective set of join result tuples;

wherein a plurality of join result tuples comprises the respective sets of join result tuples from the local join nodes of the plurality of nodes;

wherein each join result tuple, of the plurality of join result tuples, comprises a respective first row identifier from the first database object and a respective second row identifier from the second database object that identify respective rows that are matched by a local join operation;

each node of the plurality of nodes receiving a respective materialization set of join result tuples sent from one or more other nodes of the plurality of nodes; and each node of the plurality of nodes materializing a respective portion of the join result materialization based, at least in part, on the respective materialization set of join result tuples received by said node;

wherein the method is performed by one or more computing devices.

2. The method of claim 1, further comprising assigning a particular local join node, of the plurality of nodes, to a particular row in the plurality of rows comprising:

performing a hash partition operation over a particular join key in the particular row to produce a particular hash value for the particular row;

wherein the particular local join node is associated with the particular hash value; and assigning the particular local join node to the particular row based on the particular hash value for the particular row being associated with the particular local join node.

3. The method of claim 1 further comprising a particular join node, of the plurality of nodes, performing a particular local join operation over a particular set of join tuples, transmitted to the particular join node, to produce a particular set of join result tuples comprising:
    matching a first join tuple of the particular set of join tuples, from the first database object, to a second join tuple of the particular set of join tuples, from the second database object, based on the first join tuple and the second join tuple having the same join key; and
    producing a particular join result tuple, of the particular set of join result tuples, comprising a first component row identifier of the first join tuple and a second component row identifier of the second join tuple.

4. The method of claim 1, further comprising:
    identifying the first database object as a target database object based, at least in part, on determining that a first amount of data required for the join result materialization for rows of the first database object is greater than a second amount of data required for the join result materialization for rows of the second database object; and
    each local join node, of the plurality of nodes, sending each join result tuple of at least a portion of the respective set of join result tuples, produced by the local join node, to a node, of the plurality of nodes, that originated a row in the target database object identified by the first row identifier in said each join result tuple.

5. The method of claim 4, further comprising:
    a particular node, of the plurality of nodes, materializing a particular row of the join result materialization based, at least in part, on a particular join result tuple of a particular materialization set of join result tuples received by the particular node;
    wherein the particular join result tuple includes (a) a particular first row identifier that identifies a first row of the first database object and (b) a particular second row identifier that identifies a second row of the second database object;
    wherein materializing the particular row comprises:
        retrieving, from memory of the particular node, first projected columns from the first database object for the first row, of the first database object, identified by the particular first row identifier;
        requesting, from a second node of the plurality of nodes, second projected columns from the second database object for the second row, of the second database object, identified by the particular second row identifier; and
        creating the particular row, of the join result materialization, comprising both the first projected columns for the first row and the second projected columns for the second row.

6. The method of claim 4, further comprising:
    a particular node, of the plurality of nodes, receiving a particular materialization set of join result tuples;
    wherein each tuple, of the particular materialization set of join result tuples, includes a respective first row identifier that identifies a respective row, of the target database object, that is stored at the particular node.

7. The method of claim 1, further comprising:
    identifying the first database object as a target database object based, at least in part, on determining that a first amount of data required for the join result materialization for rows of the first database object is smaller than a second amount of data required for the join result materialization for rows of the second database object; and
    each local join node, of the plurality of nodes, sending each join result tuple of at least a portion of the respective set of join result tuples, produced by the local join node, to a node, of the plurality of nodes, that originated a row in the target database object identified by the first row identifier in said each join result tuple.

8. The method of claim 7, further comprising:
    a particular node, of the plurality of nodes, receiving a particular join result tuple sent from one or more other nodes of the plurality of nodes;
    the particular node retrieving first projected columns from a first row identified by a particular first row identifier from the particular join result tuple;
    the particular node creating a stitched join result tuple that includes (a) the first projected columns and (b) a particular second row identifier from the particular join result tuple; and
    the particular node sending the stitched join result tuple to another node of the plurality of nodes that stores a record that matches the particular second row identifier;
    wherein a particular materialization set of join result tuples received at the other node, of the plurality of nodes, includes the stitched join result tuple.

9. The method of claim 8, further comprising:
    the other node, of the plurality of nodes, materializing a particular row of the join result materialization based, at least in part, on the stitched join result tuple of the particular materialization set of join result tuples received by the particular node;
    wherein materializing the particular row comprises:
        retrieving, from memory of the other node, second projected columns from the second database object for a second row, of the second database object, identified by the particular second row identifier;
        creating the particular row, of the join result materialization, comprising both the first projected columns for the first row and the second projected columns for the second row.

10. The method of claim 1, further comprising:
    the database management system receiving a query that includes the join operation;
    in response to receiving the query, a query optimizer of the database management system determining, based, at least in part, on database statistics and the query, whether to use a late-materialization join for the join operation; and
    wherein the database management system performing the join operation, over the first database object and the second database object, to produce the join result materialization is performed in response to the query optimizer determining to use the late-materialization join for the query.

11. One or more non-transitory computer-readable media storing instructions which, when executed by one or more processors, cause a database management system performing a join operation, over a first database object and a second database object, which are horizontally partitioned across a plurality of nodes, to produce a join result materialization comprising:
    assigning a respective local join node, from the plurality of nodes, to each respective row of a plurality of rows in the first database object and the second database object;

transmitting, over a network to each local join node, a respective set of join tuples, wherein each join tuple of the respective set of join tuples:
  represents a respective row in a set of rows, of the plurality of rows, to which the local join node was assigned, and
  comprises a join key from the represented row and a row identifier for the represented row;
each local join node, of the plurality of nodes, performing a local join operation over the respective set of join tuples to produce a respective set of join result tuples;
wherein a plurality of join result tuples comprises the respective sets of join result tuples from the local join nodes of the plurality of nodes;
wherein each join result tuple, of the plurality of join result tuples, comprises a respective first row identifier from the first database object and a respective second row identifier from the second database object that identify respective rows that are matched by a local join operation;
each node of the plurality of nodes receiving a respective materialization set of join result tuples sent from one or more other nodes of the plurality of nodes; and
each node of the plurality of nodes materializing a respective portion of the join result materialization based, at least in part, on the respective materialization set of join result tuples received by said node.

12. The one or more non-transitory computer-readable media of claim 11, wherein the instructions further comprise instructions which, when executed by one or more processors, cause assigning a particular local join node, of the plurality of nodes, to a particular row in the plurality of rows comprising:
  performing a hash partition operation over a particular join key in the particular row to produce a particular hash value for the particular row;
  wherein the particular local join node is associated with the particular hash value; and
  assigning the particular local join node to the particular row based on the particular hash value for the particular row being associated with the particular local join node.

13. The one or more non-transitory computer-readable media of claim 11 wherein the instructions further comprise instructions which, when executed by one or more processors, cause a particular join node, of the plurality of nodes, performing a particular local join operation over a particular set of join tuples, transmitted to the particular join node, to produce a particular set of join result tuples comprising:
  matching a first join tuple of the particular set of join tuples, from the first database object, to a second join tuple of the particular set of join tuples, from the second database object, based on the first join tuple and the second join tuple having the same join key; and
  producing a particular join result tuple, of the particular set of join result tuples, comprising a first component row identifier of the first join tuple and a second component row identifier of the second join tuple.

14. The one or more non-transitory computer-readable media of claim 11, wherein the instructions further comprise instructions which, when executed by one or more processors, cause:
  identifying the first database object as a target database object based, at least in part, on determining that a first amount of data required for the join result materialization for rows of the first database object is greater than a second amount of data required for the join result materialization for rows of the second database object; and
  each local join node, of the plurality of nodes, sending each join result tuple of at least a portion of the respective set of join result tuples, produced by the local join node, to a node, of the plurality of nodes, that originated a row in the target database object identified by the first row identifier in said each join result tuple.

15. The one or more non-transitory computer-readable media of claim 14, wherein the instructions further comprise instructions which, when executed by one or more processors, cause:
  a particular node, of the plurality of nodes, materializing a particular row of the join result materialization based, at least in part, on a particular join result tuple of a particular materialization set of join result tuples received by the particular node;
  wherein the particular join result tuple includes (a) a particular first row identifier that identifies a first row of the first database object and (b) a particular second row identifier that identifies a second row of the second database object;
  wherein materializing the particular row comprises:
    retrieving, from memory of the particular node, first projected columns from the first database object for the first row, of the first database object, identified by the particular first row identifier;
    requesting, from a second node of the plurality of nodes, second projected columns from the second database object for the second row, of the second database object, identified by the particular second row identifier; and
    creating the particular row, of the join result materialization, comprising both the first projected columns for the first row and the second projected columns for the second row.

16. The one or more non-transitory computer-readable media of claim 14, wherein the instructions further comprise instructions which, when executed by one or more processors, cause:
  a particular node, of the plurality of nodes, receiving a particular materialization set of join result tuples;
  wherein each tuple, of the particular materialization set of join result tuples, includes a respective first row identifier that identifies a respective row, of the target database object, that is stored at the particular node.

17. The one or more non-transitory computer-readable media of claim 11, wherein the instructions further comprise instructions which, when executed by one or more processors, cause:
  identifying the first database object as a target database object based, at least in part, on determining that a first amount of data required for the join result materialization for rows of the first database object is smaller than a second amount of data required for the join result materialization for rows of the second database object; and
  each local join node, of the plurality of nodes, sending each join result tuple of at least a portion of the respective set of join result tuples, produced by the local join node, to a node, of the plurality of nodes, that originated a row in the target database object identified by the first row identifier in said each join result tuple.

18. The one or more non-transitory computer-readable media of claim 17, wherein the instructions further comprise instructions which, when executed by one or more processors, cause:
   a particular node, of the plurality of nodes, receiving a particular join result tuple sent from one or more other nodes of the plurality of nodes;
   the particular node retrieving first projected columns from a first row identified by a particular first row identifier from the particular join result tuple;
   the particular node creating a stitched join result tuple that includes (a) the first projected columns and (b) a particular second row identifier from the particular join result tuple; and
   the particular node sending the stitched join result tuple to another node of the plurality of nodes that stores a record that matches the particular second row identifier;
   wherein a particular materialization set of join result tuples received at the other node, of the plurality of nodes, includes the stitched join result tuple.

19. The one or more non-transitory computer-readable media of claim 18, wherein the instructions further comprise instructions which, when executed by one or more processors, cause:
   the other node, of the plurality of nodes, materializing a particular row of the join result materialization based, at least in part, on the stitched join result tuple of the particular materialization set of join result tuples received by the particular node;
   wherein materializing the particular row comprises:
      retrieving, from memory of the other node, second projected columns from the second database object for a second row, of the second database object, identified by the particular second row identifier;
      creating the particular row, of the join result materialization, comprising both the first projected columns for the first row and the second projected columns for the second row.

20. The one or more non-transitory computer-readable media of claim 11, wherein the instructions further comprise instructions which, when executed by one or more processors, cause:
   the database management system receiving a query that includes the join operation;
   in response to receiving the query, a query optimizer of the database management system determining, based, at least in part, on database statistics and the query, whether to use a late-materialization join for the join operation; and
   wherein the database management system performing the join operation, over the first database object and the second database object, to produce the join result materialization is performed in response to the query optimizer determining to use the late-materialization join for the query.

\* \* \* \* \*

UNITED STATES PATENT AND TRADEMARK OFFICE
CERTIFICATE OF CORRECTION

PATENT NO. : 10,397,317 B2  
APPLICATION NO. : 15/720442  
DATED : August 27, 2019  
INVENTOR(S) : Balkesen et al.

Page 1 of 1

It is certified that error appears in the above-identified patent and that said Letters Patent is hereby corrected as shown below:

In the Drawings

On sheet 2 of 7, in FIG. 2, under Reference Numeral 204, Line 2, delete "JOINTUPLE" and insert -- JOIN TUPLE --, therefor.

On sheet 2 of 7, in FIG. 2, under Reference Numeral 204, Line 5, delete "JOINTUPLE" and insert -- JOIN TUPLE --, therefor.

On sheet 2 of 7, in FIG. 2, under Reference Numeral 206, Line 2, delete "JOINTUPLE" and insert -- JOIN TUPLE --, therefor.

On sheet 2 of 7, in FIG. 2, under Reference Numeral 206, Line 3, delete "RESULTTUPLES;" and insert -- RESULT TUPLES; --, therefor.

On sheet 2 of 7, in FIG. 2, under Reference Numeral 206, Line 3, delete "RESULTTUPLES;" and insert -- RESULT TUPLES; --, therefor.

On sheet 2 of 7, in FIG. 2, under Reference Numeral 208, Line 2, delete "RESULTTUPLES;" and insert -- RESULT TUPLES; --, therefor.

On sheet 2 of 7, in FIG. 2, under Reference Numeral 210, Line 3, delete "RESULTTUPLES;" and insert -- RESULT TUPLES; --, therefor.

Signed and Sealed this  
Twenty-fifth Day of August, 2020

Andrei Iancu  
*Director of the United States Patent and Trademark Office*